United States Patent
Ishikawa et al.

(10) Patent No.: US 10,268,148 B2
(45) Date of Patent: Apr. 23, 2019

(54) METHOD OF MANUFACTURING HEAT-FIXING RUBBER ROLLER AND HEAT-FIXING RUBBER ROLLER

(71) Applicant: SWCC SHOWA CABLE SYSTEMS CO., LTD., Tokyo (JP)

(72) Inventors: Kazuhisa Ishikawa, Tokyo (JP); Shiro Katsuki, Tokyo (JP); Narutoshi Kusaka, Tokyo (JP); Shinji Yamazaki, Tokyo (JP); Yoshimi Matsuzawa, Tokyo (JP)

(73) Assignee: SWCC Showa Device Technology Co., Ltd., Tokyo (JP)

( * ) Notice: Subject to any disclaimer, the term of this patent is extended or adjusted under 35 U.S.C. 154(b) by 231 days.

(21) Appl. No.: 15/383,460

(22) Filed: Dec. 19, 2016

(65) Prior Publication Data
US 2017/0097594 A1 Apr. 6, 2017

Related U.S. Application Data

(63) Continuation of application No. PCT/JP2015/003034, filed on Jun. 17, 2015.

(30) Foreign Application Priority Data

Jun. 20, 2014 (JP) .................. 2014-127689

(51) Int. Cl.
*B29K 9/06* (2006.01)
*B29L 9/00* (2006.01)
(Continued)

(52) U.S. Cl.
CPC .......... *G03G 15/206* (2013.01); *B29C 35/02* (2013.01); *B29C 67/202* (2013.01);
(Continued)

(58) Field of Classification Search
CPC ......... B29C 35/02; B29C 67/202; B29C 4/44; B29C 33/40; B29C 33/405;
(Continued)

(56) References Cited

U.S. PATENT DOCUMENTS

| 2002/0028736 A1 | 3/2002 | Kishino et al. |
| 2008/0273904 A1 | 11/2008 | Nishida et al. |
| 2015/0153676 A1 | 6/2015 | Masuyama |

FOREIGN PATENT DOCUMENTS

| CN | 1340746 | 3/2002 |
| CN | 1746225 | 3/2006 |

(Continued)

OTHER PUBLICATIONS

English-language International Search Report from the Japanese Patent Office for International Application No. PCT/JP2015/003034, dated Jul. 14, 2015.
(Continued)

*Primary Examiner* — Stella K Yi
(74) *Attorney, Agent, or Firm* — Finnegan, Henderson, Farabow, Garrett & Dunner, L.L.P.

(57) ABSTRACT

A method of manufacturing a heat-fixing rubber roller includes: forming a rubber layer of a silicone rubber composition on an outer periphery of a metal core shaft, the composition containing water-soluble sugar powder and methylene glycol; vulcanizing the rubber layer; and eluting the sugar powder and the triethylene glycol from the vulcanized rubber layer to form a foam rubber layer.

8 Claims, 2 Drawing Sheets

(51) Int. Cl.
*B29C 35/02* (2006.01)
*B29C 67/20* (2006.01)
*B29L 31/00* (2006.01)
*C08L 83/04* (2006.01)
*G03G 15/20* (2006.01)
*B29K 105/04* (2006.01)
*B29K 105/24* (2006.01)
*B29K 209/06* (2006.01)
*B29K 409/06* (2006.01)
*B29K 609/06* (2006.01)
*B29K 705/00* (2006.01)

(52) U.S. Cl.
CPC ...... *G03G 15/2057* (2013.01); *B29K 2009/06* (2013.01); *B29K 2105/041* (2013.01); *B29K 2105/045* (2013.01); *B29K 2105/24* (2013.01); *B29K 2209/06* (2013.01); *B29K 2409/06* (2013.01); *B29K 2609/06* (2013.01); *B29K 2705/00* (2013.01); *B29K 2809/06* (2013.01); *B29L 2009/00* (2013.01); *B29L 2031/767* (2013.01); *C08L 83/04* (2013.01)

(58) Field of Classification Search
CPC ............ B29C 44/3488; B29K 2009/06; B29K 2105/041; B29K 2105/045; B29K 2105/24; B29K 2409/06; B29K 2609/06; B29L 2009/00; B29L 2031/767
See application file for complete search history.

(56) References Cited

FOREIGN PATENT DOCUMENTS

| | | |
|---|---|---|
| CN | 101299138 | 11/2008 |
| CN | 1018800462 | 11/2010 |
| JP | 51-14363 | 2/1976 |
| JP | 11-198250 | 7/1999 |
| JP | 2002-70838 | 3/2002 |
| JP | 2005-316329 | 11/2005 |
| JP | 2006-77099 | 3/2006 |
| JP | 2008-158332 | 7/2008 |
| JP | 2008-299314 | 12/2008 |
| WO | WO 2008/078681 | 7/2008 |
| WO | WO 2013/180070 A1 | 12/2013 |

OTHER PUBLICATIONS

Korean Patent Abstract for KR 1020080097343, filed Nov. 5, 2008.

METHOD OF MANUFACTURING HEAT-FIXING RUBBER ROLLER AND HEAT-FIXING RUBBER ROLLER

CROSS REFERENCE TO RELATED APPLICATION

This application is a continuation of prior International Application No. PCT/JP2015/003034 filed on Jun. 17, 2015, which is based upon and claims the benefit of priority from Japanese Patent Application No.2014-127689 filed on Jun. 20, 2014; the entire contents of all of which are incorporated herein by reference.

FIELD

The present invention relates to a method of manufacturing a rubber roller included in, for example, a heat fixing part of an electrophotographic copying machine, and to a heat-fixing rubber roller manufactured by the method.

BACKGROUND

Image forming apparatuses such as electrophotographic copying machines and laser beam printers typically adopt a heat fixing method that forms an image of toner on recording paper with an image forming process and thermally fixes the image. The toner is made of, for example, heat-melting resin. The image forming process includes electrophotography, electrostatic recording, and magnetic recording.

Such conventional heat-fixing methods involve a roller for fixing or pressuring. The roller often includes a metal core shaft made of for example, aluminum, a rubber layer on the shaft, made of, for example, silicone rubber, and a fluorine resin layer on the rubber layer, made of fluoroplastics with good toner releasability, such as a tetrafluoroethylene-perfluoroalkyl vinyl ether copolymer (PFA) or polytetrafluoroethylene resin (PTFE). In recent years, a roller has been increasingly used which have a rubber layer formed of foam rubber (sponge rubber), in particular, open-cell foam rubber, from viewpoints of sufficient nip width, energy saving, a reduction of volatile organic compounds (VOC). The open-cell foam rubber has higher air permeability and prevents the outside diameter and the surface hardness of the roller from varying due to a rise in temperature of the roller in operation. The variation of the surface hardness and the outside diameter vary a fixed image or a paper feed speed.

Known methods for expanding rubber, that is, for producing sponge rubber include (i) a method involving a heat foaming agent, (ii) a method involving a hollow filler, and (iii) an elution method.

Among these methods, the method (i) turns the foaming agent into cracked gas at a stage where the rubber is cross-linked, to generate bubbles, thereby producing the sponge rubber. Unfortunately, the cracked gas may cause smell. Further, the foaming agent may inhibit the curing of a rubber material when the rubber material is addition-reaction silicone rubber cured with a platinum catalyst.

The method (ii) does not easily form a uniform cell (bubble) structures because of a large density difference between the hollow filler and the silicone rubber. Further, the manufacturing cost may increase because the filler is not commonly used.

The elution method (iii) mixes water-soluble powder in the rubber, and after cross-linking the rubber, elutes the water-soluble powder into water or hot water to produce the sponge rubber. Unlike the method (i), this method does not involve the heat foaming agent. In addition, this method does not involve uncommon materials unlike the method (ii), which can decrease the manufacturing cost. Conventional elution methods, however, possibly forms a rubber skin layer (thin layer) between particles of the water-soluble powder. This layer prevents sufficient elution of water-soluble powder to obstruct formation of sponge having good uniformity and a high open-cell ratio for heat fixing.

SUMMARY

It is an object of embodiments of the present invention to provide a method capable of forming foam rubber having good uniformity and a high open-cell ratio, thereby capable of manufacturing a heat-fixing rubber roller having good fixing performance at a low cost and stably, and to provide a rubber roller manufactured by the method.

The present invention has the following embodiments (1) to (8).

(1) A method of manufacturing a heat-fixing rubber roller, the method including: forming a rubber layer of a silicone rubber composition on an outer periphery of a metal core shaft, the composition containing water-soluble sugar powder and triethylene glycol; vulcanizing the rubber layer; and eluting the sugar powder and the triethylene glycol from the vulcanized rubber layer to form a foam rubber layer.

(2) The method of manufacturing the heat-fixing rubber roller according to embodiment (1), wherein the foam rubber layer has an open cell ratio of 90% or more.

(3) The method of manufacturing the heat-fixing rubber roller according to embodiment (1) or (2), wherein the sugar powder has a particle size of 1 to 1000 μm.

(4) The method of manufacturing the heat-fixing rubber roller according to embodiment (3), wherein the sugar powder has a particle size of 10 to 400 μm.

(5) The method of manufacturing the heat-fixing rubber roller according to any one of embodiments (1) to (4), wherein the silicone rubber composition contains 100 parts by mass of the silicone rubber, 50 to 200 parts by mass of the sugar powder, and 1 to 50 parts by mass of the triethylene glycol.

(6) The method of manufacturing the heat-fixing rubber roller according to any one of embodiments (1) to (5), wherein the sugar powder is at least one selected from a group consisting of glucose, lactose, sucrose, trehalose, fructose, sugar, granulated sugar, and powdered sugar.

(7) The method of manufacturing the heat-fixing rubber roller according to any one of embodiments (1) to (6), wherein the silicone rubber is addition-reaction liquid silicone rubber.

(8) A heat-fixing rubber roller manufactured by the method of manufacturing the heat-fixing rubber roller according to any one of embodiments (1) to (7).

According to one embodiment of the present invention, it is possible to provide a method capable of forming foam rubber having good uniformity and a high open-cell ratio, thereby capable of manufacturing a rubber roller having good fixing performance at a low cost and stably and to provide a heat-fixing rubber roller manufactured by the method.

DETAILED DESCRIPTION

Embodiments of the present invention will be hereinafter described with reference to the drawings. The drawings are provided only for an illustrative purpose, and by no means limit the present invention. Note that the drawings are schematic, and for example, the relation of the thickness and the planar dimension and a thickness ratio may differ from actual ones. In the following description, constituent elements having the same or substantially the same functions are denoted by the same reference signs and a redundant description thereof will be omitted.

First Embodiment

Figure 1:
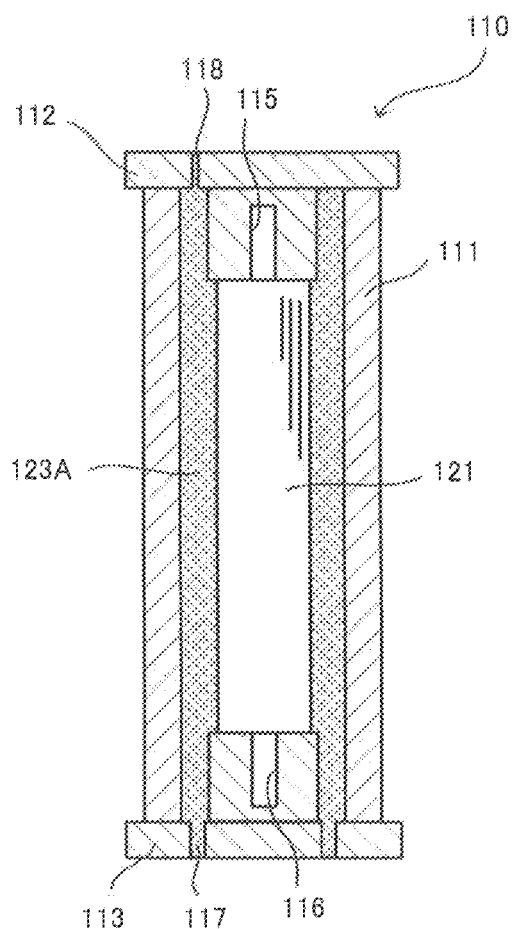
FIG. 1 is a cross-sectional view illustrating a process of manufacturing a heat-fixing rubber roller according to a first embodiment.

FIG. 1 is a cross-sectional view illustrating a process of manufacturing a heat-fixing rubber roller according to one embodiment of the present invention.

The following describes a cylindrical mold used in this embodiment.

As illustrated in FIG. 1, the cylindrical mold 110 used in this embodiment includes a cylinder 111 kept upright, and an upper plug 112 and a lower plug 113 to be respectively fit to an upper portion and a lower portion of the cylinder 111. The upper plug 112 and the lower plug 113 have core shaft support holes 115, 116 on their inner sides for concentrically supporting a metal core shaft 121 in the cylinder 111. The metal core shaft 121 is a base member and is made of, for example, aluminum, iron, or stainless steel. The lower plug 113 has a material injection hole 117, and the upper plug 112 has a material release hole 118.

In this embodiment, the cylinder 111 of the cylindrical mold 110 thus structured is kept upright. The inner surface of the cylinder 111 may be coated with a release agent (for example, DAIFREE-GA-6010 (product name, manufactured by DAIKIN INDUSTRIES, Ltd.) in advance for facilitating the release from the mold.

The metal core shaft 121 made of aluminum, iron, or stainless steel is inserted into the cylinder 111, and the upper plug 112 and the lower plug 113 are fit to the upper portion and the lower portion of the cylinder 111 to concentrically support the metal core shaft 121. A primer may be applied and dried on the surface of the metal core shaft 121 in advance.

Then, a curable silicone rubber composition 123A containing water-soluble sugar powder and triethylene glycol is injected into a gap between the metal core shaft 121 and the cylinder 111 and is primarily vulcanized to be a silicone rubber layer.

The silicone rubber, which is used for a base of the curable silicone rubber composition 123A and contains the water-soluble sugar powder and the triethylene glycol, may be any silicone rubber that takes on a liquid form at room temperatures and cures to be a rubbery elastic body. It may be addition-reaction liquid silicone rubber (LTV silicone rubber) or may be condensation-curing liquid silicone rubber. Addition-reaction liquid silicone rubber that cures at temperatures of about 80 to 150° C. is especially suitable as the silicone rubber.

Examples of the sugar powder include glucose, lactose, sucrose, trehalose, fructose, sugar, granulated sugar, and powdered sugar. Out of these, any one kind may be used alone or a mixture of two kinds or more may be used. Among these, granulated sugar and powdered sugar have high solubility in water and thus are better suited as the sugar powder.

The sugar powder preferably has a 1 to 1000 µm particle size. Sugar powder whose particle size is less than 1 µm takes a long time to be eluted and in addition may remain in the rubber. The use of sugar powder whose particle size is more than 1000 µm leads to a decrease of rubber strength to make the roller less durable. To obtain the sugar powder whose particle size is 1 to 1000 µm, a sieve sorting method is usable, for instance. The particle size of the sugar powder is more preferably 10 to 400 µm and is still more preferably 10 to 100 µm.

The content of the sugar powder in the silicone rubber composition is preferably 500 to 200 parts by mass and more preferably 100 to 150 parts by mass per 100 parts by mass of the base silicone rubber. If the content of the sugar powder per 100 parts by mass of the base silicone rubber is less than 50 parts by mass, it is difficult to form foam rubber having open cells. If this content is over 200 parts by mass, the rubber strength decreases and thus the roller becomes less durable.

The triethylene glycol contained with the sugar powder in the silicone rubber composition is a component that facilitates eluting the sugar powder from the vulcanized rubber layer, enabling to form a foam rubber layer having a high open-cell ratio. Specifically, triethylene glycol has low compatibility with silicone rubber and high compatibility with sugar powder. The triethylene glycol mixed with the sugar powder in the silicone rubber forms a layer around the sugar powder with which it has high compatibility to prevent a skin layer of the silicone rubber from being formed between the sugar powder and the sugar powder. This facilitates eluting the sugar powder from the vulcanized silicone rubber layer, and the triethylene glycol itself is easily eluted from the silicone rubber layer, enabling to form the foam rubber layer having a high open-cell ratio.

Besides triethylene glycol, various other materials such as ethylene glycol are water-soluble, and have low compatibility with silicone rubber and high compatibility with sugar powder. The triethylene glycol in combination with the sugar powder especially facilitates formation of the heat-fixing rubber roller with a suitable open-cell ratio. Ethylene glycol may be contained in the silicone rubber composition as a component contained in combination with the triethylene glycol. Examples of such a component that can be combined other than ethylene glycol include glycerin, propylene glycol, pentaerythritol, and glycerin-α-monochlorohydrin, diethylene glycol, dipropylene glycol, and polyglycerin.

The content of the triethylene glycol in the rubber material is preferably 1 to 50 parts by mass, more preferably 5 to 50 parts by mass, and still more preferably 20 to 30 parts by mass per 100 parts by mass of the base silicone rubber. The methylene glycol whose content per 100 parts by mass of the base silicone rubber is less than 1 part by mass does not have the effect of making the open-cell ratio sufficient The triethylene glycol whose content is more than 50 parts by mass does not exhibit a higher effect, and may have a problem such as bleeding.

An appropriate temperature of the primary vulcanization depends on the kind of the silicon rubber used. When the base silicone rubber is, for example, LTV silicon rubber, the temperature of the primary vulcanization is preferably within an 80 to 150° C. range, and more preferably within a 100 to 130° C. range.

After the primary vulcanization of the silicone rubber composition, the cylindrical mold 110 is opened and the metal core shaft 121 having the silicon rubber layer thereon is taken out. Specifically, the upper plug 112 and the lower plug 113 are detached and the metal core shaft 121 together with the silicon rubber layer is extracted from the cylinder 111. Next, the extracted metal core shaft 121 is immersed in water. Upon immersed, the silicone rubber layer is permeated with the water, and the sugar powder and the triethylene glycol dispersed in the rubber layer are dissolved in the permeated water to be discharged out of the rubber layer together with the water. To promote the elution of the sugar powder and the triethylene glycol from the rubber layer, the water is preferably hot water at about 60 to 90° C., for instance. The immersion time is normally about one to eight hours, though depending on the thickness of the rubber layer or the temperature of the immersion water. Using an immersion tank including a mechanism which continuously or intermittently supplies and discharges the water can more promote the elution of the sugar powder and the triethylene glycol.

Thereafter, the metal core shaft 121 including the silicone rubber layer, from which the sugar powder and the triethylene glycol have been eluted, is taken out from the water and the silicone rubber layer is secondarily vulcanized. An appropriate temperature of the secondary vulcanization depends on the kind of the silicone rubber used, similarly to the temperature of the primary vulcanization. Specifically, when the base silicone rubber is, for example, the LTV silicone rubber, the temperature is preferably within a 180 to 230° C. range, and more preferably within a 200 to 220° C. range. At least part of the triethylene glycol remaining in the rubber layer without discharged in the previous step is discharged in the process of the secondary vulcanization.

Figure 2:
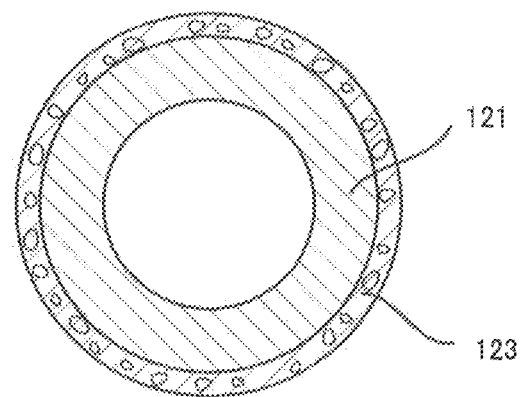
FIG. 2 is a cross-sectional view illustrating an example of the heat-fixing rubber roller manufactured in the first embodiment.

The above process can produce the heat-fixing rubber roller including the silicone foam, rubber layer 123 on the metal core shaft 121, as illustrated in FIG. 2, for instance. Open cells are formed in the silicone foam rubber layer 123 by the elation of the sugar powder and the triethylene glycol.

The above-described method can form the silicone foam rubber layer having a high open-cell ratio of 90% or more because the triethylene glycol compounded together with the sugar powder in the silicone rubber composition promotes the discharge of the sugar powder dispersed in the silicone rubber layer to the outside. The heat-fixing rubber roller including the silicone foam rubber layer with such a high open-cell ratio can stably form a good fixed image because of a little change in its outside diameter and surface hardness due to a temperature increase during the operation, in addition, its low heat conductivity can contribute to a reduction of power consumption.

In the above-described embodiment, after the primary vulcanization of the silicone rubber composition, the cylindrical mold is opened and the metal core shall having the silicone rubber layer thereon is taken out from the inside of the cylindrical mold and is immersed in the water. However, in some case, the cylindrical mold with the metal core shaft left therein may be immersed in the water, without being opened.

Figure 3:
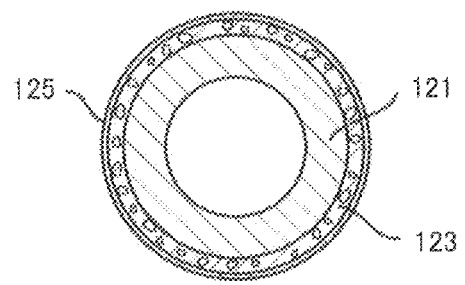
FIG. 3 is a cross-sectional view illustrating an example of a heat-fixing rubber roller manufactured in a modification example of the first embodiment.

In the present invention, as illustrated in FIG. 3, the silicone foam rubber layer 123 formed as described above may have thereon a layer 125 made of releasable resin such as fluorine resin. A method of forming the releasable resin layer 125 is not limited, and may be, for example, a method of attaching a tube made of the releasable resin on the silicone foam rubber layer or a method of applying a dispersion containing the releasable resin on the silicone foam rubber layer, followed by baking. The releasable resin layer 125 typically has an about 10 to 100 µm thickness.

Examples of the releasable resin other than the fluorine resin include polyimide resin and polyamide-imide resin, and fluorine resin is typically used. Examples of fluorine resin include a tetrafluoroethylene-perfluoroalkyl vinyl ether copolymer (PFA), polytetrafluoroethylene (PTFE), a tetrafluoroethylene-hexafluoropropylene copolymer (FEP), an ethylene-tetrafluoroethylene copolymer (ETFE), polychlorotrifluoroethylene (PCTFE), an ethylene-chlorotrifluoroethylene copolymer (ECTFE), and polyvinylidene fluoride (PVdF).

The releasable resin tube used to form the releasable resin layer preferably has an inside diameter that is about 90 to 100% of the outside diameter of the silicone foam rubber layer in order to come into closer contact with the silicone foam rubber layer. To more surely bond the releasable resin tube to the silicone foam rubber layer, preferably, the outer peripheral surface of the silicone foam rubber layer is coated with an adhesive in advance, or the inner surface of the releasable resin tube is coated with a primer or is roughened by, for example, chemical etching, in advance.

Second Embodiment

The three-layer roller illustrated in FIG. 3, including the metal core shaft 121, the silicone foam rubber layer 123 on the shaft 121, and the releasable resin layer 125 on the layer made of the releasable resin tube, can be manufactured using the previously described cylindrical mold 110 illustrated in FIG. 1. Hereinafter, a second embodiment will be described with reference to FIG. 4, mainly focusing on what are different from, the above-described first embodiment.

Figure 4:
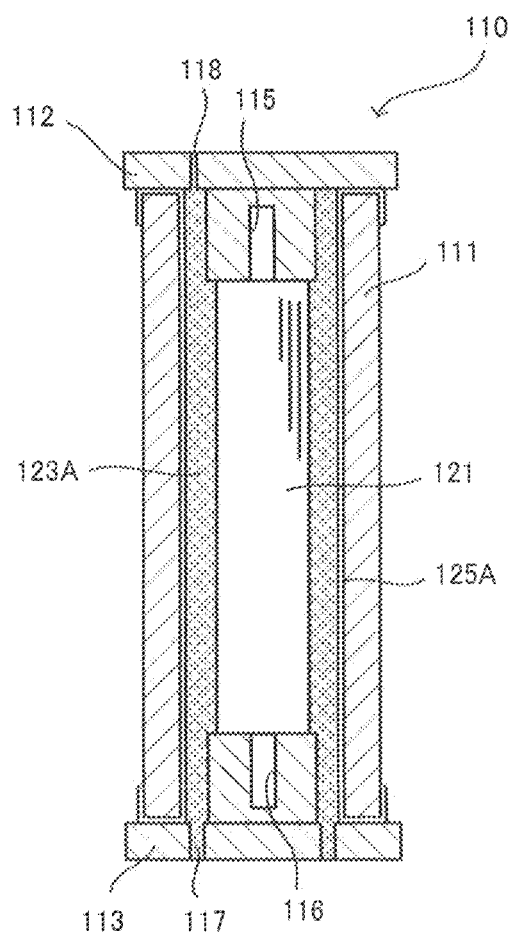
FIG. 4 is a cross-sectional view illustrating a process of manufacturing a heat-fixing rubber roller according to a second embodiment of the present invention.

FIG. 4 is a cross-sectional view illustrating a process of manufacturing a heat-fixing rubber roller including a releasable resin layer according to the second embodiment of the present invention. In FIG. 4, parts common to those in FIG. 1 are denoted by the same reference signs.

As illustrated in FIG. 4, in this embodiment, a releasable resin tube 125A is inserted into the upright cylinder 111 of the cylindrical mold 110, and is fixed with its both ends folded. Next, the metal core shaft 121 is inserted into the releasable resin tube 125A, and the upper plug 112 and the lower plug 113 are fit to the upper portion and the lower portion of the cylinder 111 to concentrically support the metal core shaft 121. Next, the curable silicone rubber composition 123A containing the water-soluble sugar powder and the triethylene glycol is injected to a gap between the metal core shaft 121 and the releasable resin tube 125A and is primarily vulcanized to be the silicone rubber layer. After the primary vulcanization, the cylindrical mold 110 is immersed in water as it is, and the sugar powder and the triethylene glycol dispersed in the silicone rubber layer are dissolved in the water to be discharged out of the silicone rubber layer. Thereafter, the cylindrical mold 110 is extracted from the water, the upper plug 112 and the lower plug 113 are detached, and the metal core shaft 121 together with the releasable resin tube 125A and the silicone rubber layer is pulled out of the cylinder 111, followed by secondary vulcanization. This process can produce the three-layer heat-fixing rubber roller as illustrated in FIG. 3, in which the metal core shaft 121 is covered with the silicone foam rubber layer 123 and the releasable resin layer 125 in sequence.

This method can efficiently manufacture the heat-fixing rubber roller with excellent fixing performance, including the silicone foam rubber layer with a high open-cell ratio and the releasable resin layer thereon.

Hitherto, the embodiments of the present invention have been described, but these embodiment do not limit the present invention, and various modifications and changes can be made therein without departing from the scope of the present invention.

For example, to form the silicone rubber layer, any generally and conventionally known method of forming a roller rubber layer such as the following methods (1) and (2) may be used instead of the method in which the liquid silicone rubber composition is injected into the mold and vulcanized as in the above-described embodiments: (1) a method in which a rubber mixture is prepared by mixing solid silicone rubber, sugar powder, and triethylene glycol, a sheet is fabricated from the mixture, and the sheet is wound around the metal core shaft and thereafter vulcanized; and (2) a method in which the rubber mixture prepared in the same manner as in the method (1), the rubber mixture is extruded in a hollow cylindrical shape using an extruder, the hollow cylindrical mixture is inserted and fit on the metal core shaft, and thereafter is heat-vulcanized.

EXAMPLES

Next, the present invention will be more specifically described based on examples but the present invention is by no means limited to these examples.

As illustrated in FIG. 1, an aluminum metal core shaft 121 with an 18 mm outside diameter having an outer peripheral surface coated with Primer #101 (product name, manufactured by Shin-Etsu Chemical Co., Ltd,) was inserted into the cylinder 111, and the upper plug 112 and the lower plug 113 were fit to the upper portion and the lower portion of the cylinder 111 to concentrically support the metal core shaft 121.

A silicone rubber composition was prepared as follows: Commercially available granulated sugar was pulverized and sorted with a sieve to obtain granulated sugar powder with a 10 to 200 μm particle size; 25 parts by mass triethylene glycol was mixed with 130 parts by mass of the obtained granulated sugar powder to form a mixture; 100 parts by mass LTV silicone rubber (product name G91S, manufactured by Shin-Etsu Chemical Co., Ltd.) was added to the mixture; and they were mixed for thirty minutes with an agitator.

The silicone rubber composition was vacuum-defoamed and then injected into the cylinder 111. After the injection, the temperature was increased up to 120° C. to cure the silicone rubber by 30 minute heating. After the silicone rubber cured, the cylindrical mold 110 was opened, and the metal core shaft 121 having the silicone rubber layer thereon was taken out from the inside of the cylindrical mold 110 and immersed in 80° C. hot water. Two hours later, the metal core shaft 121 having the silicone rubber layer thereon was taken out from the hot water, and the silicone rubber was post-cured by four-hour 220° C. heating (secondary vulcanization), whereby a silicone foam rubber roller was fabricated.

An open-cell ratio of the silicone foam rubber layer in the fabricated silicone foam rubber roller, which was measured by the following method, was 95%.

Measurement of Open-Cell Ratio

The specific gravity (OG) of the silicone rubber composition as a raw material of the silicone foam rubber layer and the specific gravity (FG) and the weight (DW) of the silicone rubber layer after the foaming are measured. The silicone foam, rubber layer is sunk in water in a vessel put in a vacuum vessel, the pressure in the vacuum vessel is reduced to 10 mmHg or less and thereafter is returned to normal pressure, the silicone foam rubber layer is left for five minutes to absorb the water, and the weight (WW) of the silicone rubber layer absorbed the water is measured. From these measurement values, the open-cell ratio is calculated by the following expression.

open-cell ratio (%)=[($WW-DW$)/specific gravity of water (1.00)]/[(1−($FG/OG$))×($DW/FG$)]×100]

Then, the surface of the rubber layer of the silicone foam rubber roller was further coated with an adhesive (product name KE-1880, manufactured by Shin-Etsu Chemical Co., Ltd.). After that, a PFA tube (product name 451HPJ, manufactured by Du Pont-Mitsui Fluorochemicals Co., Ltd.) having a 25 mm outside diameter, a 227 mm length, and a 30 μm thickness was inserted to be fit on the surface of the rubber layer, and heated at 120° C. for one hour to fabricate a PFT tube-covered silicone rubber roller.

The fabricated roller was put in a hermetic vessel and a change of the roller outside diameter was checked in a vacuum state. A change in the outside diameter is not found, leading to the confirmation that the silicone foam rubber layer of this roller has a sufficient open-cell ratio.

Comparative Example

Silicone rubber was molded in the same manner as in the example except that triethylene glycol was not mixed in the silicone rubber composition. An attempt to elute sugar into water was not successful, and a sponge-like rubber roller is not fabricated.

What is claimed is:

1. A method of manufacturing a heat-fixing rubber roller, the method comprising:
   forming a rubber layer of a silicone rubber composition on an outer periphery of a metal core shaft, the composition containing water-soluble sugar powder and triethylene glycol;
   vulcanizing the rubber layer; and
   eluting the sugar powder and the triethylene glycol from the vulcanized rubber layer to form a foam rubber layer.

2. The method of manufacturing the heat-fixing rubber roller according to claim 1, wherein the foam rubber layer has an open cell ratio of 90% or more.

3. The method of manufacturing the heat-fixing rubber roller according to claim 1, wherein the sugar powder has a particle size of 1 to 1000 μm.

4. The method of manufacturing the heat-fixing rubber roller according to claim 3, wherein the sugar powder has a particle size of 10 to 400 μm.

5. The method of manufacturing the heat-fixing rubber roller according to claim 1, wherein the silicone rubber composition contains 100 parts by mass of the silicone rubber, 50 to 200 parts by mass of the sugar powder, and 1 to 50 parts by mass of the triethylene glycol.

6. The method of manufacturing the heat-fixing rubber roller according to claim 1, wherein the sugar powder is at least one selected from a group consisting of glucose, lactose, sucrose, trehalose, fructose, sugar, granulated sugar, and powdered sugar.

7. The method of manufacturing the heat-fixing rubber roller according to claim 1, wherein the silicone rubber is addition-reaction liquid silicone rubber.

8. A heat-fixing rubber roller manufactured by the method of manufacturing the heat-fixing rubber roller according to claim 1.

* * * * *